US006229928B1

United States Patent
Matsuzawa

(10) Patent No.: US 6,229,928 B1
(45) Date of Patent: May 8, 2001

(54) IMAGE PROCESSING SYSTEM FOR REMOVING BLUR USING A SPATIAL FILTER WHICH PERFORMS A CONVOLUTION OF IMAGE DATA WITH A MATRIX OF NO-NEIGHBOR ALGORITHM BASED COEFFICIENTS

(75) Inventor: Toshiaki Matsuzawa, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/152,973

(22) Filed: Sep. 14, 1998

(30) Foreign Application Priority Data

Sep. 17, 1997 (JP) .................................................. 9-251923

(51) Int. Cl.[7] .............................. G06T 5/00; G06K 9/40; G06F 17/10
(52) U.S. Cl. ........................ 382/255; 382/261; 382/279; 708/315
(58) Field of Search ..................... 382/255, 260, 382/263, 261, 268, 279; 708/315

(56) References Cited

U.S. PATENT DOCUMENTS

| 4,284,897 | | 8/1981 | Sawamura et al. | |
|---|---|---|---|---|
| 4,927,254 | * | 5/1990 | Kino et al. | 382/263 |
| 5,241,372 | * | 8/1993 | Ohba | 348/578 |
| 5,561,611 | * | 10/1996 | Ainash et al. | 382/255 |
| 5,621,474 | * | 4/1997 | Mancuso et al. | 382/263 |
| 5,933,513 | * | 8/1999 | Yoneyama et al. | 382/255 |
| 6,040,152 | * | 3/2000 | Kupfer et al. | 382/255 |

FOREIGN PATENT DOCUMENTS

| 3-44613 | | 2/1991 | (JP) . |
| 6-38041 | | 2/1994 | (JP) . |
| 06038041 | * | 2/1994 | (JP) . |

OTHER PUBLICATIONS

D.A. Agard; "Optical Sectioning Microscopy"; 1984; pp. 191.219; Ann, Rev. Biophys. Bioeng.
D.A. Agard; "Fluorescence Microscopy in three Dimensions"; 1989; pp. 353–377; Methods In Cell Biology, vol. 30.
Y. Hiraoka; "Determination of Three–Dimensional Imaging Properties of a Light Microscope System"; Feb. 1990; pp. 325–333; Biophysical Society, vol. 57.

* cited by examiner

Primary Examiner—Scott Rogers
(74) Attorney, Agent, or Firm—Frishauf, Holtz, Goodman, Langer & Chick, P.C.

(57) ABSTRACT

A 4-line buffer sequentially takes in image data items and temporarily stores a specific size of image data. A spatial filter in which a coefficient matrix based on the no-neighbor algorithm in a restoration process has been set performs a spatial filtering process on the image data items sequentially outputted from the 4-line buffer to produce a restored image based on the no-neighbor algorithm. This enables images to be restored in real time, which produces an image whose luminance distribution is approximate to that of the specimen.

11 Claims, 6 Drawing Sheets

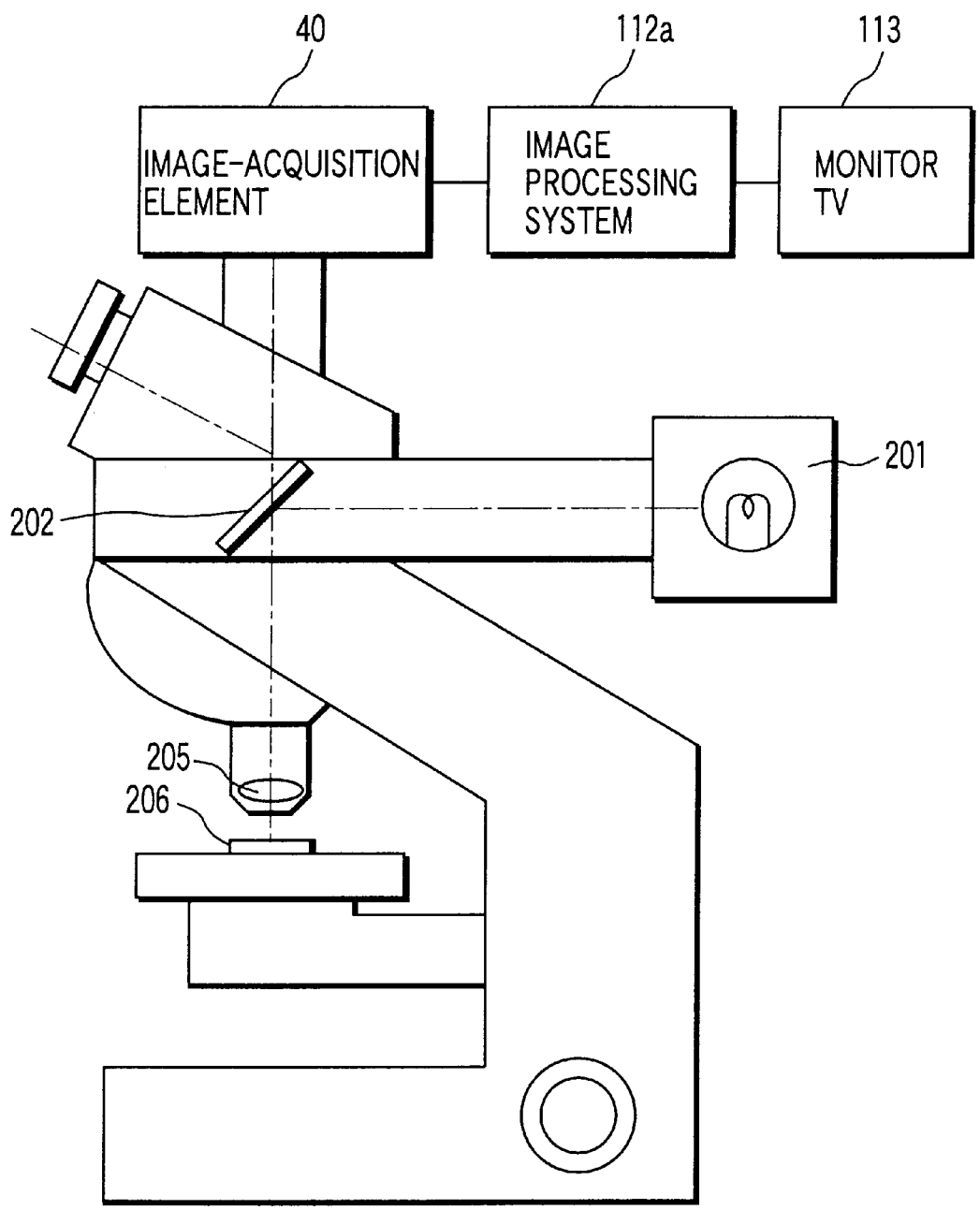
F I G. 7

IMAGE PROCESSING SYSTEM FOR REMOVING BLUR USING A SPATIAL FILTER WHICH PERFORMS A CONVOLUTION OF IMAGE DATA WITH A MATRIX OF NO-NEIGHBOR ALGORITHM BASED COEFFICIENTS

BACKGROUND OF THE INVENTION

The present invention relates to an image processing system which easily removes a blur in image data obtained through an optical instrument such as an optical microscope and produces a restored image with an improved picture quality.

The picture quality of an image obtained by observing an object through an optical instrument, such as an optical microscope, deteriorates because of a blur in the image caused by the instrument, as compared with the original luminance distribution of the object. The technique for obtaining an ideal image by removing a blur caused by an optical instrument from the image using numerical computation is known as the restoration of or deconvolution of an image.

A similar technique to this is for emphasizing an image. These techniques are for improving the contrast of an image. The purpose of image restoration is to reproduce the luminance distribution of the original object accurately, whereas the purpose of image emphasis is to clarify the part to be observed at the sacrifice of accurate reproduction of the luminance distribution.

A method of forming images of a specimen under an optical microscope while changing the depth at regular intervals to produce a three-dimensional image (or a stacked image) is known as optical sectioning.

When a stacked image is produced by optical sectioning, a blur (a point spread function: PSF) in the optical microscope spreads more at each of the images $g_{i-1}$, $g_i$, and $g_{+1}$ in the direction of depth (or in the direction of z) than in the horizontal direction (or in the direction of xy) as shown in FIG. 1. As a result, each of the images $g_{i-1}$, $g_i$, and $g_{i+1}$ does not have a cross-sectional image accurately reflecting the luminance distribution of the specimen. For example, in the case of the image $g_i$, a blur leaking from each of the overlying image $g_{i-1}$ and underlying image $g_{i+1}$ is superposed on the image $g_i$.

One restoration algorithm for removing a blur from such a stacked image easily is the nearest neighbor algorithm. For the nearest neighbor algorithm, refer to, for example, D. A. Agard, "Optical Sectioning Microscopy: Cellular Architecture in Three Dimensions", Ann. Rev. Biophys. Bioeng, Vol. 13, pp. 191–219, 1984 and D. A. Agard, et at., "Fluorescence Microscopy in Three Dimensions", Methods in Cell Biology, Vol. 30, pp. 353–377, 1989.

In the nearest neighbor algorithm, only the effect of each of the image $g_{i-1}$ just above the target image $g_i$ and the image $g_{i+1}$ just blow the image $g_i$ is eliminated and the smaller influence of the other planes is ignored. Several types of nearest neighbor algorithms have been proposed according to the degree of approximation.

In the simplest example, a restored image fi is obtained from the i-th stacked image gi and the overlying image gi-1 and underlying image g+1 using the following equation:

$$fi = c2[gi - c1(gi-1+gi+1)*h] \qquad (1)$$

where c1 and c2 are parameters for adjusting the removal of a blur, h is the value of the point spread function PSF on the overlying and underlying images gi-1, gi+1 when the center of the point spread function PSF is placed in data on the i-th image data item, and * represents convolution.

In such a restoration algorithm, if the sampling interval in the direction of depth of the stacked image is moderately small, the i-th stacked image gi and the overlying and underlying images gi-1, gi+1 will be almost the same. Therefore, even if the overlying and underlying images gi-1, gi+1 are replaced with the i-th image gi, and the nearest neighbor algorithm for the i-th stacked image gi is applied, a blur introduced from each of the overlying and underlying images gi-1, gi+1 will be removed spuriously. This restoration algorithm is known as the no-neighbor algorithm.

In the no-neighbor algorithm, a restored image fi is obtained using the following equation:

$$fi = c2[gi - 2c1(gi*h)] \qquad (2)$$

Because in the no-neighbor algorithm, there is no need of referring to the overlying and underlying images gi-1, gi+1, a sheet of image data which is not a stacked image can be processed.

The value h of the point spread function PSF is generally assigned a theoretical value. Discarding the fractions of small values generally give a matrix ranging from 5×5 to 11×11.

Therefore, the convolution of the value h of the point spread function PSF and the stacked image gi constitute a spatial filtering process using h as a coefficient matrix. Differently from a spatial filtering process serving as emphasis means, the no-neighbor algorithm has the advantage that the size and value of the coefficient matrix is always optimized using the theoretical values of the point spread function PSF.

For a method of finding PSF theoretical values, refer to, for example, Y. Hiraoka, et al., "Determination of three-dimensional imaging properties of a light microscope system (Partial confocal behavior in epifluorescence microscopy)", Biophysical Journal Vol. 57, p. 325–333, February, 1990.

One example of applying the no-neighbor algorithm is an image processing system in a confocal laser scanning microscope (CLSM), whose configuration is as shown in FIG. 2.

In FIG. 2, a CPU 1 drives a scanning driver 2 to scan a convergent light of the laser light on a specimen. A light-receiving element 3, such as a photomultiplier, receives the light returned from the specimen through a light-receiving pinhole, photoelectrically converts the light into an image signal, and outputs the signal. The image signal is digitized by an A/D converter 4. The CPU 1 samples the digitized signal and temporarily stores the sampled signal in a memory 5.

Next, the CPU 1 reads the image data from the memory 5, do image calculations using equation (2) to produce a restored image fi, and displays the image fi on a monitor television 6.

After such processing, a high-contrast image with a similar luminance distribution to that of the specimen is obtained.

As described above, in the no-neighbor algorithm, even if there is only one sheet of image data, spurious three-dimensional restoration can be carried out easily on the basis of the point spread function PSF of the optical instrument. As in other types of restoration, the image data is temporarily stored in the memory 5. Thereafter, the image data is read from the memory 5 and subjected to image calculations to produce a restored image fi. In view of this, the no-neighbor algorithm cannot be used for real-time observation.

Since the confocal laser scanning microscope has a high resolution in the direction of depth, it is characterized by reproducing the three-dimensional luminance distribution of the specimen faithfully. When the light returned from the specimen is faint, however, the diameter of the pinhole on the reception side has to be made larger to compensate for a deficiency of light.

Because making the diameter of the pinhole larger leads to a decrease in the resolution in the direction of depth, the image becomes brighter but its contrast decreases, resulting in a blurred image.

To bring the blurred image into the form of an image with a luminance distribution approximate to that of the specimen by compensating for a decrease in the resolution through restoration, such as the no-neighbor algorithm, the image data has to be stored temporarily in the memory 5. Thereafter, the image data has to be read and subjected to image calculations to produce a restored image fi.

There is a known method of emphasizing an image signal to display image data more clearly. The method, however, provides no assurance that the displayed image has a faithful reproduction of the actual luminance distribution.

In the case of wide-field optical microscopes, they have a low resolution in the direction of depth inherently. Therefore, they cannot provide an accurate cross-sectional luminance distribution unless suitable restoration is effected.

BRIEF SUMMARY OF THE INVENTION

Accordingly, it is an object of the present invention to provide an image processing system which restores an image in real time and produces an image whose luminance distribution is approximate to that of a specimen.

According to one aspect of the present invention, there is provided an image processing system for obtaining a blur-free restored image from image signals sequentially outputted from an image acquisition system, comprising: conversion means for converting the image signals sequentially outputted from the image acquisition system into image data items; storage means for sequentially taking in the image data items and temporarily storing a specific size of image data; and a spatial filter, in which coefficients based on the no-neighbor algorithm in a restoration process have been set in advance, and to which the image data items converted by the conversion means and the image data items stored by the storage means are input for performing a spatial filtering process using the coefficients on the inputted image data items sequentially outputted from the storage means and the conversion means to produce a restored image based on the no-neighbor algorithm.

In the system, the image acquisition system may be a microscope.

In the system, the image acquisition system may be a confocal microscope.

In the system, the image acquisition system may be a confocal laser scanning microscope.

In the system, the image acquisition system may be a disk-scanning confocal microscope.

In the system, the image acquisition system may be an optical microscope.

In the system, the conversion means may include an A/D converter for digitizing the image signal.

In the system, the storage means may include a buffer for sending the image data items converted by the converting means in a sequentially delayed line by line manner to the spatial filter. The system may further comprise a processor for calculating the coefficients on the basis of the no-neighbor algorithm in the restoration process.

In the system, the spatial filter may perform a spatial filtering process of $f=g*k$ to obtain the restored image f, where $k=\{c2(\delta-2c1h)\}$, g: image data items outputted from the storage means and the conversion means, *: convolution, k: coefficient matrix, $\delta$: Dirac's delta function, h: point spread function related to the image acquisition system, c1, c2: constants.

In the system, the spatial filter may include an n-row, m-column matrix $k=[kij]$, $(i=-(m-1)/2, \ldots, (m-1)/2, j=-(n-1)/2, \ldots, (n-1)/2$; where m and n are odd numbers), and each of the kij is determined to $kij=c2(\delta ij-2c1hij)$ using a delta function matrix $\delta=[\delta ij]$ ($\delta ij=1$ when $i=j=0$, $\delta ij=0$ except when $i=j=0$), a point spread function $h(x, y, z)$ related to the image acquisition system, a matrix $h=[hij]$ each determined to $hij=h(i\cdot\Delta x, j\cdot\Delta y, \Delta z)$ from sampling intervals $\Delta x$ and $\Delta y$ for a length and a breadth of the image data and a constant $\Delta z$, and constants c1 and c2.

The system may further comprise a processor for calculating the coefficient matrix.

According to another aspect of the present invention, there is provided an image processing system for obtaining a blur-free restored image from image signals sequentially outputted from an image acquisition system, comprising: an A/D converter for converting the image signals sequentially outputted from the image acquisition system into image data items; a buffer for sequentially taking in the image data items and temporarily storing a specific size of image data; a processor for calculating coefficients on the basis of the no-neighbor algorithm in a restoration process; and a spatial filter, in which the coefficients calculated by the processor on the basis of the no-neighbor algorithm in the restoration process have been set in advance, and to which the image data items converted by the A/D converter and the image data items taken in by the buffer are input for performing a spatial filtering process using the coefficients on the inputted image data items to produce a restored image based on the no-neighbor algorithm.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention in which:

FIG. 7 shows an example of the configuration of a wide-field microscope to which an image processing system according to a second embodiment of the present invention has been applied;

DETAILED DESCRIPTION OF THE INVENTION

Hereinafter, referring to the accompanying drawings, embodiments of the present invention will be explained.

[First Embodiment]

A first embodiment of the present invention will be explained.

In the first embodiment, a case where an image processing system according to the present invention has been applied to a confocal laser scanning microscope (image acquisition system) will be explained. The present invention exhibits a better performance especially when a fluorescence confocal laser scanning microscope is used. Before explanation of the image processing system of the present invention, the fluorescence confocal laser scanning microscope will be described briefly.

Figure 1:
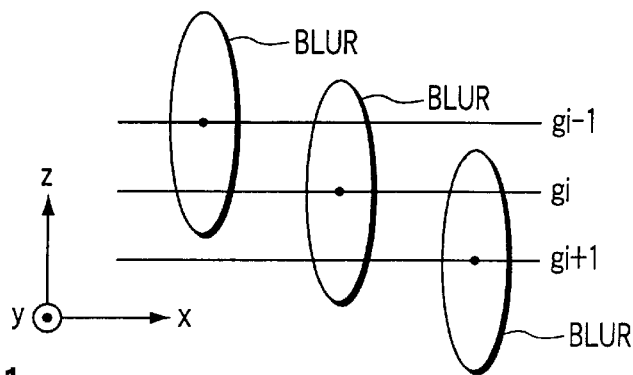
FIG. 1 is a pictorial diagram to help explain a restoration algorithm for removing a blur from a stacked image easily.
Figure 2:
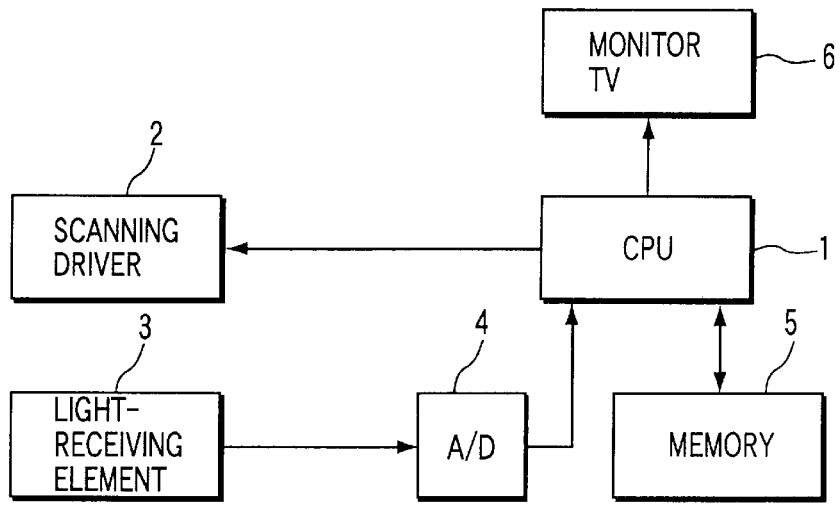
FIG. 2 shows the configuration of an image processing system in a confocal laser scanning microscope using the no-neighbor algorithm.
Figure 3:
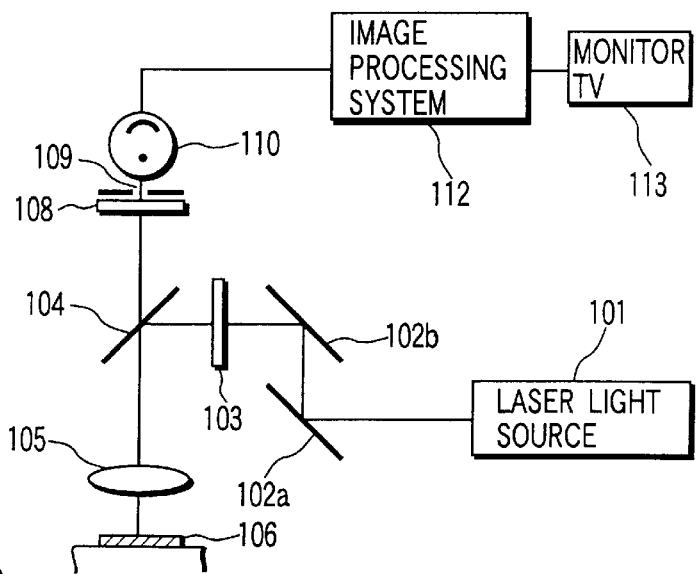
FIG. 3 shows an example of the configuration of a fluorescence confocal laser scanning microscope to which an image processing system according to a first embodiment of the present invention has been applied.

FIG. 3 shows an example of the configuration of the fluorescence confocal laser scanning microscope (image acquisition system) to which an image processing system of the first embodiment is applied.

The example of the configuration shown in FIG. 3 is adopted from U.S. Pat. No. 4,284,897; however, FIG. 3 of the present invention is a modification of the corresponding figure in the document. For the detail of the configuration of the fluorescence confocal laser scanning microscope, refer to the above document.

In the fluorescence confocal laser scanning microscope, after the laser light outputted from a laser light source 101 has been reflected by galvanomirrors 102a, 102b which performs two-dimensional scanning by a scanning driver 10 as described later, the laser light is reflected by a dichroic mirror 104 via a filter 103 for selecting wavelengths to be passed through. The reflected light transmits via an objective 105 and is projected on a specimen 106. The fluorescence generated from the specimen 106 returns to the dichroic mirror 104 along with the same light path described above, transmits through the dichroic mirror 104, and is sent to a light-receiving element 110 via a filter 108 and a light-receiving pinhole 109.

After the fluorescence has been sensed by the light-receiving element 110, this light-receiving element 110 sends an image signal to the image processing system according to the present invention. The image processing system 112 does specific calculations on the basis of the inputted image data and displays the restored image of the specimen 106 on a monitor television 113.

Hereinafter, a preferred configuration of the image processing system of the present invention will be explained.

Figures 4, 6A, 6B:
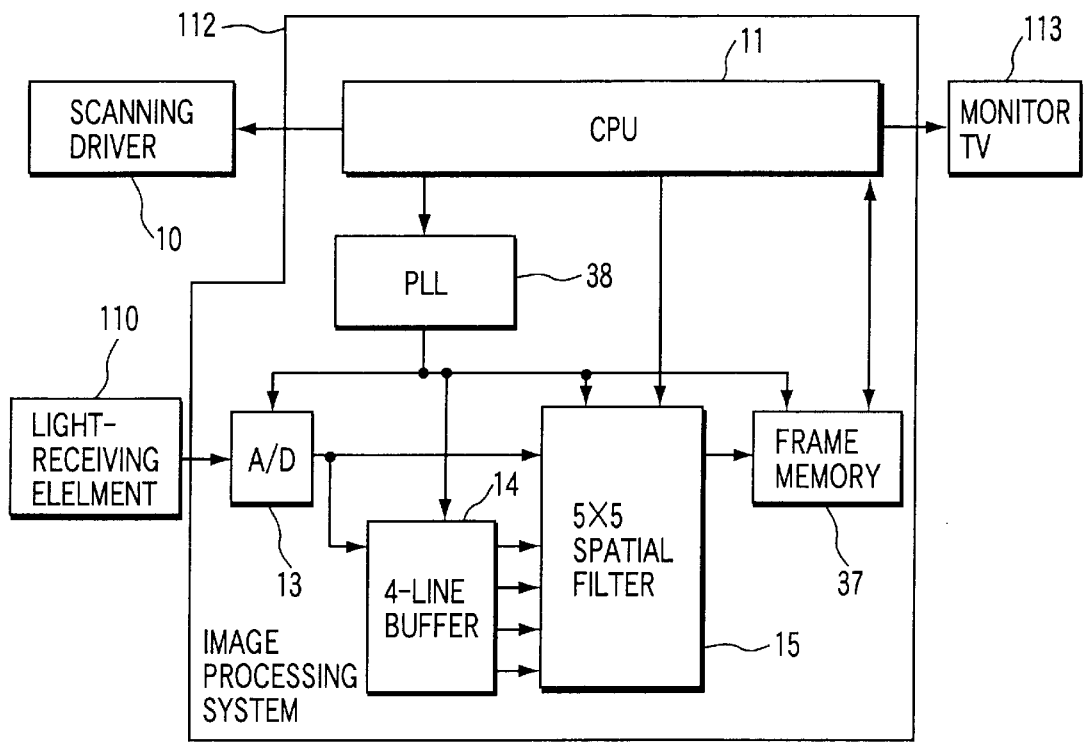
FIG. 4 shows the configuration of the image processing system according to the first embodiment applied to the fluorescence confocal laser scanning microscope.
FIGS. 6A and 6B pictorially illustrate the values of a Dirac's delta function and a theoretical point spread function.

FIG. 4 shows the configuration of the image processing system according to the first embodiment applied to a fluorescent confocal laser scanning microscope.

A scanning driver 10 is for controlling the scanning system constituted by galvanomirrors 102a, 102b of the fluorescent confocal laser scanning microscope under the control of the CPU 11. The scanning system scans (raster-scans) a convergent light of the laser light outputted from the laser light source on the surface and inside of the specimen two-dimensionally.

The light-receiving element 110 is for receiving the feeble light (fluorescence) returned from the specimen through the light-receiving pinhole of the fluorescent confocal laser scanning microscope when the scanning driver 10 scans a convergent light of the laser light on the surface and inside of the specimen two-dimensionally and for photoelectrically converting the received light into an image signal. The light-receiving element 110 comprises, for example, a photomultiplier tube (PMT).

A 4-line buffer 14 and a 5×5 matrix spatial filter 15 are connected to the output terminal of the light-receiving element 110 via an A/D converter 13 for digitizing the image signal from the light-receiving element 110 to produce image data.

The 4-line buffer 14 sequentially takes in the image data items from the A/D converter 13 and temporarily stores a specific size of image data. Specifically, the 4-line buffer 14 has the function of storage means which sends to the spatial filter 15 the image data item for each of a second to a fifth line which are delayed by one line, two lines, three lines, and four lines respectively.

Coefficients based on the no-neighbor algorithm in a restoration process are set in the spatial filter 15. The spatial filter 15 has the function of performing a spatial filtering process on the image data items sequentially outputted from the 4-line buffer 14 and A/D converter 13 to produce a restored image using the no-neighbor algorithm.

Figure 5:
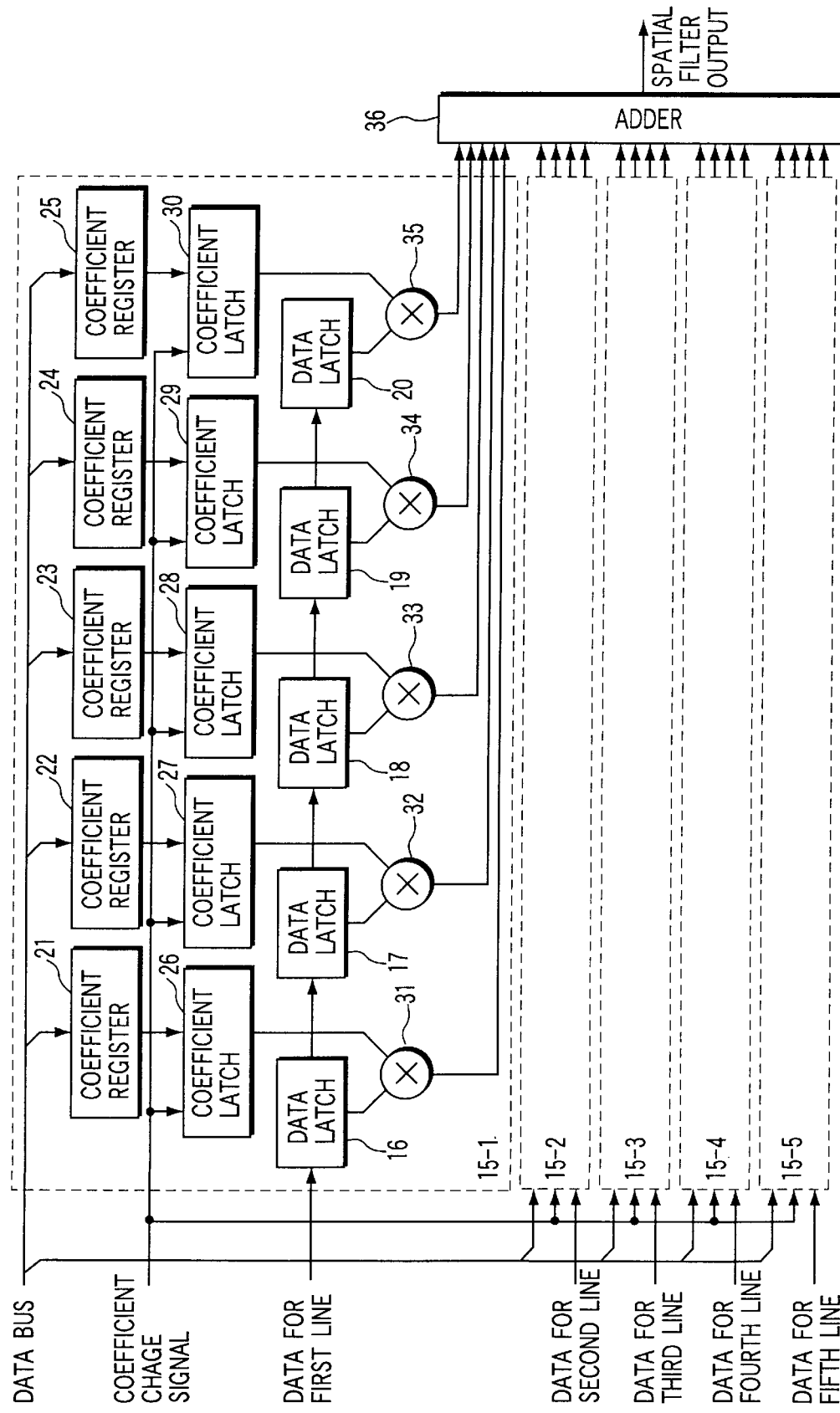
FIG. 5 shows a concrete configuration of a spatial filter in the image processing system.

FIG. 5 shows a concrete configuration of the spatial filter 15.

The spatial filter 15 is divided into a first to a fifth block 15-1 to 15-5 corresponding to the first to fifth lines respectively. The image data items outputted from the A/D converter 13 is inputted without any change to the first block 15-1. The image data items delayed by one line to four lines sequentially at the 4-line buffer 14 are inputted to the second to fifth blocks 15-2 to 15-5 respectively.

The first to fifth blocks 15-1 to 15-5 have the same configuration. So, the configuration of each of the blocks 15-1 to 15-5 will be described by reference to the first block 15-1.

The first block 15-1 includes five data latch circuits 16 to 20 connected in series. The A/D converter 13 is connected to the data latch circuit 16 connected at the input-side end. This enables the image data in the first line inputted to the first block 15-1 to shift pixel by pixel through the five data latch circuits 16 to 20, which causes five consecutive pixel data items in one line to be stored in the first block 15-1.

The first block 15-1 also includes five coefficient registers 21 to 25. The CPU 11 has set coefficients based on the no-neighbor algorithm in the restoration process, that is, a coefficient matrix, in those coefficient registers 21 to 25 via a data bus.

Specifically, to realize the no-neighbor algorithm in one spatial filtering process, equation (2) representing the restored image f is rearranged as follows:

$$f = g * k \tag{3}$$

where $$k = c2(\delta - 2c1h) \tag{4}$$

$\delta$ is a Dirac's delta function, and in this case, the matrix is an n-row, m-column matrix (5-row, 5-column matrix in this embodiment) in which only the coefficient in the center has a value of 1 and each of the other coefficients has a value of 0, where m and n are odd numbers, as shown in FIG. 6A.

The theoretical value h of the point spread function PSF is a PSF theoretical value, taking into account the wavelength of light, the numerical aperture of the objective of the fluorescence confocal laser scanning microscope, and the diameter of light-receiving pinhole.

For the theoretical value h of the point spread function PSF, each element hij (i,j=−2, ..., 2) in a 5 row, 5 column matrix h=[hij] is determined from the theoretical value h (x, y, z) of a three-dimensional point spread function PSF as follows:

$$hij = h(i \cdot \Delta x, j \cdot \Delta y, \Delta z) \tag{5}$$

where $\Delta x$ and $\Delta y$ are sampling intervals for the length and breadth of the image data and $\Delta z$ is an imaginary distance from the overlying and underlying image data items. $\Delta z$ is set at a value approximate to the focal depth.

Then, the theoretical value h of the point spread function PSF is normalized so that the sum of all the elements may be 1.

It is effective that two parameters (or constants) c1, c2 have values of about 0.45 and 10 respectively.

Since the effect of the no-neighbor algorithm varies depending on $\Delta z$, c1, and c2, it is necessary to adjust these values to optimal values while watching the processed image.

Accordingly, the CPU 11 does calculations using equation (4) to determine the coefficient matrix k and sets the matrix k in the coefficient registers 21 to 25.

Multiplier sections 31 to 35 are connected to the coefficient registers 21 to 25 via coefficient latch circuits 26 to 30 respectively. The coefficient latch circuits 26 to 30 have the function of latching the coefficient matrix k set in the coefficient registers 21 to 25 in response to a coefficient change signal from the CPU 11 and sending the matrix to the multiplier sections 31 to 35 respectively.

These multiplier sections 31 to 35 have the function of multiplying the five consecutive pixel data items latched in the data latch circuits 16 to 20 by the coefficient matrix k latched in the coefficient latches 26 to 30 and sending the product signal to an adder 36.

The adder 36 has the function of adding the product signals from the first to fifth blocks 15-1 to 15-5 and sending the result as a spatial filtered output to a frame memory 37.

A phase-locked loop (PLL) 38 (see FIG. 4) has the function of managing the operation of the A/D converter 13, 4-line buffer 14, spatial filter 15, and frame memory 37 on the basis of the synchronizing signal outputted from the CPU 11 to synchronize them with the scanning of the convergent light of the laser light on the specimen.

The CPU 11 has the function of doing calculations using equation (4) to determine the coefficient matrix k, setting the matrix k in the coefficient registers 21 to 25, reading the image data from the frame memory 37, and displaying the data on the monitor television 113.

The operation of the system constructed as described above will be explained.

First, the CPU 11 does calculations using equation (4) to determine the coefficient matrix k{=c2($\delta$−2c1h)} on the basis of the numerical aperture of the objective of the fluorescence confocal laser scanning microscope and so on, and sets the coefficient matrix k in the coefficient registers 21 to 25.

Next, the fluorescence confocal laser scanning microscope drives the scanning driver 10 under the control of the CPU 11 and scans a convergent light of the laser light outputted from the laser light source 101 on the surface and inside of the specimen 106 two-dimensionally by means of the galvanomirrors 102a and 102b.

While the convergent light of the laser light outputted from the laser light source is scanned on the surface and inside of the specimen 106 two-dimensionally, the light-receiving element 110 receives the faint light (fluorescence) returned from the specimen 106 through the light-receiving pinhole 109 of the fluorescence confocal laser scanning microscope, photoelectrically converts the light into an image signal, and outputs the signal.

The image signal outputted from the light-receiving element 110 is digitized by the A/D converter 13 into image data. The image data is then sent to the 4-line buffer 14 and spatial filter 15.

The 4-line buffer 14 sequentially takes in the image data items from the A/D converter 13, delays the respective image data items by one line, two lines, three lines, and four lines in that order to produce the image data items for the second to fifth lines and sends these image data items to the spatial filter 15.

Using the coefficients based on the no-neighbor algorithm in the restoration process, the spatial filter 15 performs a spatial filtering process on the image data items sequentially outputted from the 4-line buffer 14 and A/D converter 13 to produce a restored image.

Specifically, as shown in FIG. 5, in the spatial filter 15, the image data item from the A/D converter 13 is inputted without any change to the first block 15-1. The image data items delayed by one line to four lines in that order at the 4-line buffer 14 are inputted to the second to fifth blocks 15-2 to 15-5, respectively.

In the first block 15-1, the image data item for a first line is received from the data latch circuit 16 connected to the input-side end. The image data is shifted pixel by pixel through the five data latch circuits 16 to 20, thereby holding five consecutive data items in one line.

Receiving coefficient change signals from the CPU 11, the coefficient latch circuits 26 to 30 latch the coefficient matrix k set in the coefficient registers 21 to 25 and send it to the multiplier sections 31 to 35.

Then, the multiplier sections 31 to 35 receive not only the five consecutive pixel data items latched in the data latch circuits 16 to 20 but also the coefficient matrix k latched in the coefficient latch circuits 26 to 30, multiply these image data items by the coefficient matrix k, and send the product signals to the adder 36.

The adder 36 adds the product signals from the first to fifth blocks 15-1 to 15-5 and outputs the result as a spatial filtered output to the frame memory 37, which stores it.

After one line has been processed, the line data in the 4-line buffer 14 is shifted one line downward and the image data in the next one line is processed.

After the fluorescence confocal laser scanning microscope has finished scanning one screen, the CPU 11 reads the image data item from the frame memory 37 and displays it on the monitor television 113. The representation on the screen remains unchanged until a subsequent image data item is read from the frame memory 37.

From this time on, the scanning of the specimen 106 and the display of the image are repeated until the CPU 11 gives a stop instruction.

When the coefficient matrix k is changed, the CPU 11 sends not only a new coefficient matrix k to the coefficient registers 21 to 25 but also the coefficient change signal to the coefficient latch circuits 26 to 30 of the spatial filter 15, thereby causing the coefficient latch circuits 26 to 30 to latch the new coefficient matrix k.

As described above, with the first embodiment, the 4-line buffer 14 sequentially takes in the image data items, thereby temporarily holding a specific size of image data. The spatial filter 15, in which a coefficient matrix k based on the no-neighbor algorithm in the restoration process has been set, performs a spatial filtering process on the image data items sequentially outputted from A/D converter 13 and the 4-line buffer 14 to produce a restored image f. This enables an image to be restored in real time and an image with a luminance distribution approximate to that of the specimen to appear on the monitor television 113. Consequently, even when the light-receiving pinhole 109 of the fluorescence confocal laser scanning microscope is made larger, it is possible to observe a high-contrast cross-sectional image whose luminance distribution is approximate to that of the specimen.

When the specimen is displaced with a constant amount in the direction of depth each time the operation in one period has been completed, a stacked image subjected to the no-neighbor algorithm is obtained. Storing the image as an image file eliminates the need of performing another image processing later.

The first embodiment may be modified as follows.

Instead of the A/D converter 13, the CPU 11 may be caused to supply raw image data to the 4-line buffer 14 and spatial filter 15. This enables the stored unprocessed image data to be processed at high speed using the no-neighbor algorithm by means of the spatial filter 15.

If the measured value of the point spread function PSF is present, it may be used in place of the theoretical value.

[Second Embodiment]

A second embodiment of the present invention will be explained. The same parts as those in FIG. 4 (in the first embodiment) are indicated by the same reference symbols. Detailed explanation of them will not be given.

In the second embodiment, a case where an image processing system according to the present invention has been applied to an optical microscope (image acquisition system), specifically to a wide-field optical microscope, will be explained. First, this wide-field optical microscope will be simply explained before explaining the image processing system according to the present invention.

FIG. 7 shows an example of the configuration of a wide-field microscope (image acquisition system) to which an image processing system according to a second embodiment of the present invention has been applied.

In this wide-field microscope, after the light outputted from a light source 201 is reflected by a half-mirror 202, the reflected light is projected on a specimen 206 via an objective 205. The light reflected by the specimen 206 transmits through the half-mirror 202, and is sent to an image acquisition element 40.

After the light from the specimen 206 is sensed by the image acquisition element 40, this image acquisition element 40 sends an image signal to an image processing system 112a according to the present invention. The image processing system 112a does specific calculations on the basis of the inputted image data and displays the restored image of the specimen 206 on a monitor television 113.

Next, a preferred configuration of the image processing system of the present invention will be explained.

Figure 8:
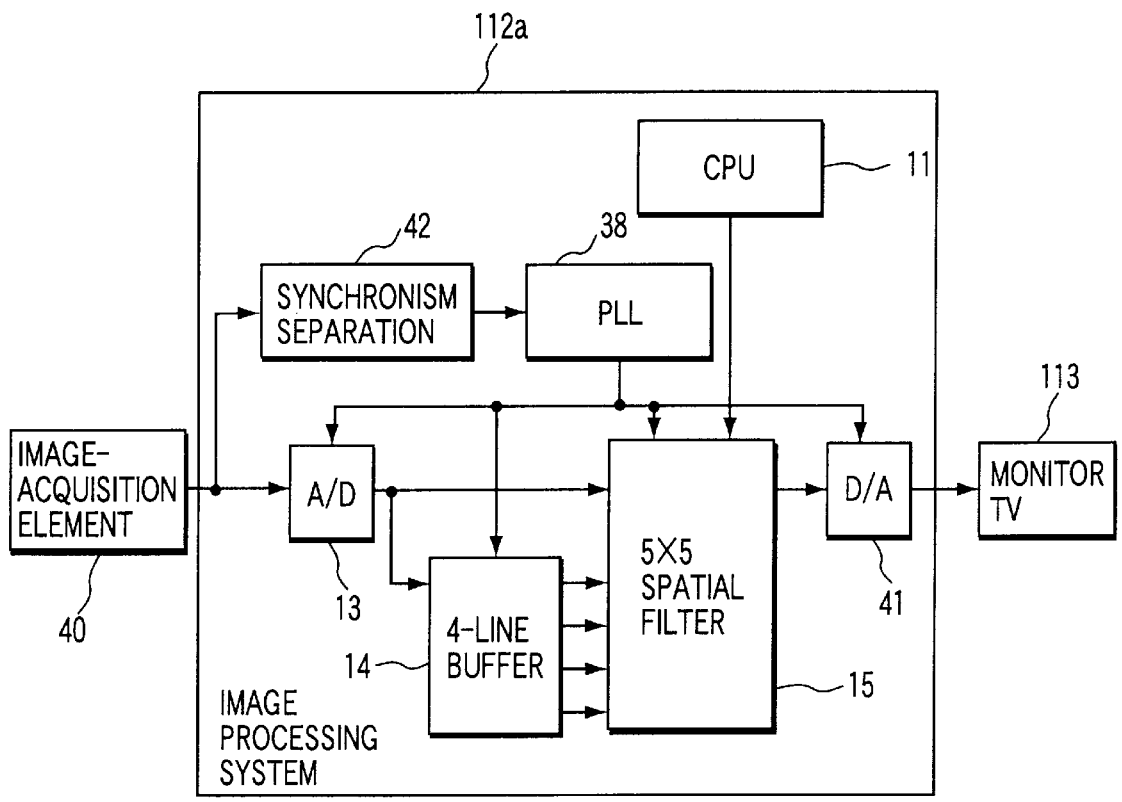
FIG. 8 shows the configuration of an image processing system according to a second embodiment of the present invention applied to a wide-field optical microscope.

FIG. 8 shows the configuration of an image processing system according to a second embodiment of the present invention applied to a wide-field optical microscope (image acquisition system) as an optical microscope.

An image acquisition element 40 comprises, for example, a monochrome CCD element for obtaining the image observed under an optical microscope. The image signal outputted from the image acquisition element 40 is send to an image processing system 112a according to the present invention, and is converted by an A/D converter 13 in the image processing system 112a into digital image data, which is then sent to a 4-line buffer 14 and a spatial filter 15.

A D/A converter 41 connected to the output of the spatial filter 15 has the function of converting the image data subjected to a spatial filtering process at the spatial filter 15 into analog image signal and sending the analog image signal to a monitor television 113.

A synchronism separation circuit 42 separates a synchronizing signal from the image signal outputted from the image acquisition element 40, sending the synchronizing signal to a phase-locked loop 38, and managing the operation of the A/D converter 13, 4-line buffer 14, spatial filter 15, and D/A converter 41.

The operation of the system constructed as described above will be explained.

First, the CPU 11 does calculations using equation (4) to determine a coefficient matrix $k\{=c2(\delta-2c1h)\}$ on the basis of the numerical aperture of the objective of the wide-field microscope and so on and sets the coefficient matrix k in the coefficient registers 21 to 25.

Then, the image acquisition element 40 obtains the image observed under the wide-field microscope and outputs the image signal.

The image signal from the image acquisition element 40 is digitized by the A/D converter 13 into image data. The image data is then sent to the 4-line buffer 14 and spatial filter 15.

The 4-line buffer 14 takes in the image data items from the A/D converter 13 sequentially, delays the respective image data items by one line, two lines, three lines, and four lines in that order to produce the image data items for the second to fifth lines and sends these image data items to the spatial filter 15.

Using the coefficient matrix k based on the no-neighbor algorithm in a restoration process, the spatial filter 15 performs a spatial filtering process on the image data items sequentially outputted from the 4-line buffer 14 and A/D converter 13 to produce image data on a restored image.

The image data is converted by the D/A converter 41 into an analog image signal. The analog image signal is then sent to the monitor television 113, which displays it.

When the coefficient matrix k is changed, the CPU 11 sends not only a new coefficient matrix k to the coefficient registers 21 to 25 but also the coefficient change signal to the coefficient latch circuits 26 to 30 of the spatial filter 15, thereby causing the coefficient latch circuits 26 to 30 to latch the new coefficient matrix k.

With the second embodiment, even when the image processing system has been applied to the wide-field microscope whose resolution is generally low in the direction of depth, the image under the wide-field microscope can be processed using the no-neighbor algorithm in real time, which enables the image to be observed as a cross-sectional image whose luminance distribution is approximate to that of the specimen.

The second embodiment may be modified as follows.

For example, when the function of processing the RGB components in parallel is further added to the above configuration, this enables color images to be processed. In this case, it is effective to use a coefficient matrix k optimized independently for each RGB component.

While in the second embodiment, the case where the image processing system 112a is applied to the wide-field microscope is explained, it is also effective that the image processing system 112a is applied to the microscope for observing fluorescence.

While in the first embodiment, the case where scanning is done using the galvanomirrors is explained, the image processing system of the present invention is applicable to a confocal microscope (image acquisition system) which performs scanning (disk scanning) using a disk provided with a plurality of pinholes instead of the galvanomirrors. For this implementation, the image processing system according to the second embodiment of the present invention can be used.

Hereinafter, a disk-scanning fluorescence confocal microscope (image acquisition system) will be explained briefly.

Figure 9:
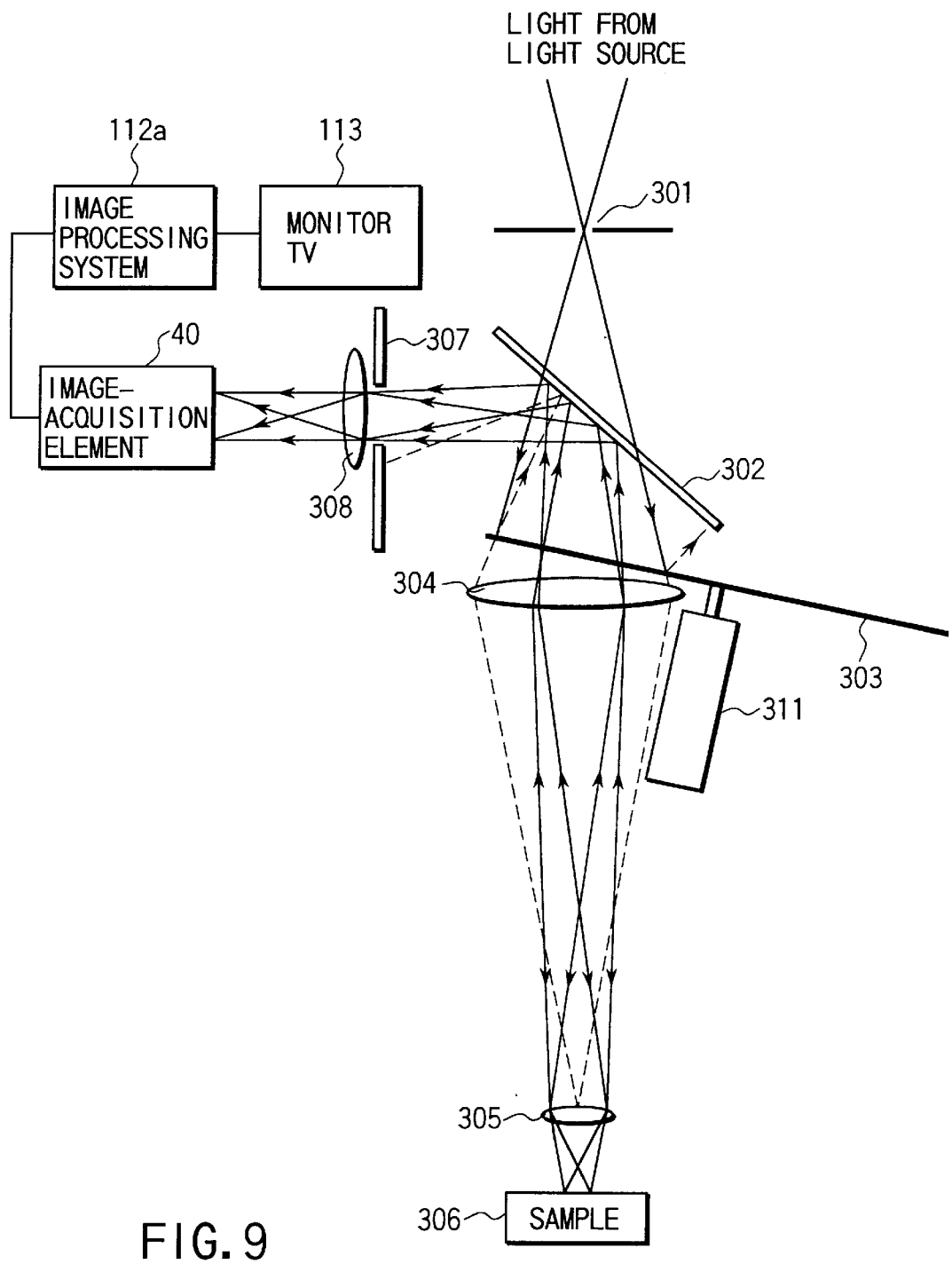
FIG. 9 shows an example of the configuration of a disk-scanning fluorescence confocal microscope.

FIG. 9 shows an example of the configuration of the disk-scanning fluorescence confocal microscope (including an image acquisition element 40).

The example of the configuration shown in FIG. 9 is adopted from U.S. Pat. No. 4,927,254. For the detail of the configuration of the disk-scanning confocal microscope, refer to the above document.

An excitation light outputted from the light source travels via a pinhole 301, a beam splitter 302, pinholes in a rotating disk 303 explained later, a field lens 304 and an objective 305, and is projected on a specimen 306. Thereafter, fluorescence generated at the specimen 306 passes through the objective 305, field lens 304, the pinhole in the rotating disk 303, and is reflected by the beam splitter 302. The reflected light is send to an image acquisition element via an opening 307 and a relay lens 308. The rotating disk 303 is rotated at a constant speed.

Figure 10:
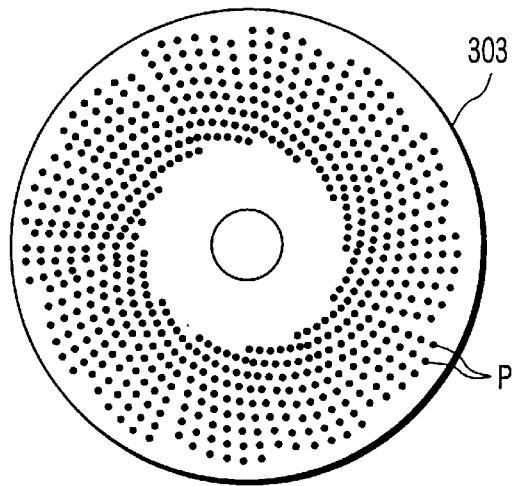
FIG. 10 illustrates the structure of a rotating disk used in disk scanning.

In the rotating disk 303, a plurality of pinholes P are made in a spiral as shown in FIG. 10. Each pinhole P in the rotating disk 303 is designed to allow not only the excitation light from the light source but also the fluorescence from the specimen 306 to pass through. The excitation light passing through each pinhole P is projected independently on a part of the specimen 306. The reason why a plurality of pinholes are arranged in a spiral as shown in FIG. 10 is to enable all of the target region to be observed in real time while the disk 303 is rotating at a specific number of revolutions.

As described above, it is effective to apply an image processing system of the present invention to the disk-scanning fluorescence confocal microscope.

As described above in detail, with the present invention, it is possible to provide an image processing system capable of restoring images in real time and obtaining an image whose luminance distribution is approximate to that of the specimen.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing system for obtaining a blur-free restored image from image signals sequentially outputted from an image acquisition system, said image processing system comprising:

conversion means for converting the image signals sequentially outputted from said image acquisition system into image data items;

storage means for sequentially taking in said image data items and temporarily storing a specific size of image data; and a spatial filter, in which coefficients based on a no-neighbor algorithm in a restoration process have been set in advance, and to which the image data items converted by said conversion means and the image data items stored by said storage means are input, for performing a spatial filtering process using said coefficients on the inputted image data items to produce a restored image based on the no-neighbor algorithm;

wherein said spatial filtering process comprises a process of $f = g * k$ to obtain the restored image f, where $k = \{c2(\delta - 2c1h)\}$, g represents the inputted image data items from said storage means and said conversion means,

* represents a convolution, k represents a coefficient matrix,

δ represents Dirac's delta function, h represents a point spread function related to said image acquisition system, and c1 and c2 are constants.

2. An image processing system according to claim 1, wherein said image acquisition system comprises a microscope.

3. An image processing system according to claim 1, wherein said image acquisition system comprises a confocal microscope.

4. An image processing system according to claim 1, wherein said image acquisition system comprises a confocal laser scanning microscope.

5. An image processing system according to claim 1, wherein said image acquisition system comprises a disk-scanning confocal microscope.

6. An image processing system according to claim 1, wherein said image acquisition system comprises an optical microscope.

7. An image processing system according to claim 1, wherein said conversion means comprises an A/D converter for digitizing said image signal.

8. An image processing system according to claim 1, wherein said storage means comprises a buffer for sending the image data items converted by said converting means in a sequentially delayed line by line manner to said spatial filter.

9. An image processing system according to claim 1, further comprising a processor for calculating said coefficients based on the no-neighbor algorithm in the restoration process.

10. An image processing system for obtaining a blur-free restored image from image signals sequentially outputted from an image acquisition system, said image processing system comprising:

conversion means for converting the image signals sequentially outputted from said image acquisition system into image data items;

storage means for sequentially taking in said image data items and temporarily storing a specific size of image data; and a spatial filter, in which coefficients based on a no-neighbor algorithm in a restoration process have been set in advance, and to which the image data items converted by said conversion means and the image data items stored by said storage means are input, for performing a spatial filtering process using said coefficients on the inputted image data items to produce a restored image based on the no-neighbor algorithm;

wherein said spatial filter includes an n-row, m-column matrix k=[kij], (i=−(m−1)/2, ..., (m−1)/2, j=−(n−1)/2, ..., (n−1)/2; where m and n are odd numbers), and each of said kij is determined to kij=c2(δij−2c1hij) using a delta function matrix δ=[δij] (δij=1 when i=j=0, δij=0 except when i=j=0), a point spread function h(x, y, z) related to said image acquisition system, a matrix h=[hij] each determined to hij=h(i·Δx, j·Δy, Δz) from sampling intervals Δx and Δy for a length and a breadth of the image data and a constant Δz, and constants c1 and c2.

11. An image processing system for obtaining a blur-free restored image from image signals sequentially outputted from an image acquisition system, said image processing system comprising:

an A/D converter for converting the image signals sequentially outputted from said image acquisition system into image data items;

a buffer for sequentially taking in said image data items and temporarily storing a specific size of image data;

a processor for calculating coefficients based on a no-neighbor algorithm in a restoration process; and a spatial filter, in which the coefficients calculated by said processor based on of the no-neighbor algorithm in the restoration process have been set in advance, and to which the image data items converted by said A/D converter and the image data items taken in by said buffer are input, for performing a spatial filtering process using said coefficients on the inputted image data items to produce a restored image based on the no-neighbor algorithm; and wherein said spatial filtering process comprises a process of f=g*k to obtain the restored image f, where k={c2(δ−2c1h)}, g represents the inputted image data items from said storage means and said conversion means,

* represents a convolution, k represents a coefficient matrix,

δ represents Dirac's delta function, h represents a point spread function related to said image acquisition system, and c1 and c2 are constants.

* * * * *